(12) United States Patent
Sakuma et al.

(10) Patent No.: US 9,812,871 B2
(45) Date of Patent: Nov. 7, 2017

(54) REGULATING DEVICE CONTROL SYSTEM, REGULATING DEVICE CONTROL METHOD, AND RECORDING MEDIUM FOR REGULATING THE BALANCE BETWEEN POWER SUPPLY AND DEMAND

(71) Applicant: NEC Corporation, Tokyo (JP)

(72) Inventors: Hisato Sakuma, Tokyo (JP); Koji Kudo, Tokyo (JP); Hitoshi Yano, Tokyo (JP); Yuma Iwasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 568 days.

(21) Appl. No.: 14/381,528

(22) PCT Filed: Nov. 15, 2012

(86) PCT No.: PCT/JP2012/079632
§ 371 (c)(1),
(2) Date: Aug. 27, 2014

(87) PCT Pub. No.: WO2013/128727
PCT Pub. Date: Sep. 6, 2013

(65) Prior Publication Data
US 2015/0012150 A1 Jan. 8, 2015

(30) Foreign Application Priority Data
Feb. 28, 2012 (JP) ................. 2012-041609

(51) Int. Cl.
*G05D 3/12* (2006.01)
*H02J 3/46* (2006.01)
(Continued)

(52) U.S. Cl.
CPC ............... *H02J 3/46* (2013.01); *H01M 10/48* (2013.01); *H02J 3/32* (2013.01); *H02J 7/34* (2013.01)

(58) Field of Classification Search
None
See application file for complete search history.

(56) References Cited

U.S. PATENT DOCUMENTS

2008/0281663 A1* 11/2008 Hakim ................ B60L 11/1824
705/7.25
2010/0312411 A1* 12/2010 Brooke .................... H02J 7/34
700/292

(Continued)

FOREIGN PATENT DOCUMENTS

| JP | 2005-188965 | 7/2005 |
| JP | 2006-094648 | 4/2006 |

(Continued)

OTHER PUBLICATIONS

International Search Report dated Feb. 12, 2013.
(Continued)

*Primary Examiner* — Adam Lee
(74) *Attorney, Agent, or Firm* — Finnegan, Henderson, Farabow, Garrett & Dunner, L.L.P.

(57) ABSTRACT

A regulating-device-control system for controlling the operation of regulating devices for regulating the balance between electric power supply and demand includes: memory means storing, for each regulating device, correlation information expressing correlation of a state of the regulating device, an amount of power allotted to the regulating device, and an amount of variability in performance of the regulating device; determination means receiving state information that expresses the state of each regulating device and electric power information that expresses an amount of regulated power required for regulating the balance between electric power supply and demand, and, based on the correlation information, the state information, and the electric power information, determining the amount of electric power to be allotted to each regulating device (Continued)

such that the total value of the amount of variability in performance of each of the regulating devices is minimized under conditions in which the state of each regulating device is the state expressed by the state information and the total value of the amount of power to be allotted to the regulating devices is the amount of regulated power; and control means controlling the operation of each regulating device based on the determination result of the determination means.

12 Claims, 6 Drawing Sheets

(51) Int. Cl.
    *H01M 10/48*     (2006.01)
    *H02J 3/32*     (2006.01)
    *H02J 7/34*     (2006.01)

(56) References Cited

U.S. PATENT DOCUMENTS

2011/0264286 A1* 10/2011 Park .................. G06Q 10/00
    700/286

2012/0056591 A1* 3/2012 Abe .................. H01M 10/3909
    320/132
2012/0242293 A1* 9/2012 Yumura .................. H02J 3/32
    320/134
2014/0210267 A1* 7/2014 Ishida .................. H02J 7/0021
    307/31

FOREIGN PATENT DOCUMENTS

| JP | 2008-118790 | 5/2008 |
|---|---|---|
| JP | 2008-278559 | 11/2008 |
| JP | 2009-044862 | 2/2009 |
| JP | 2010-035280 | 2/2010 |
| JP | 2010-159661 | 7/2010 |
| WO | WO 2013/038458 A1 | 3/2013 |

OTHER PUBLICATIONS

Japanese Office Action dated Jan. 10, 2017, by the Japanese Patent Office in counterpart Japanese Patent Application No. 2014-501964.

* cited by examiner

REGULATING DEVICE CONTROL SYSTEM, REGULATING DEVICE CONTROL METHOD, AND RECORDING MEDIUM FOR REGULATING THE BALANCE BETWEEN POWER SUPPLY AND DEMAND

CROSS-REFERENCE TO RELATED PATENT APPLICATIONS

This application is a National Stage Entry of International Application No. PCT/JP2012/079632, filed Nov. 15, 2012, which claims priority from Japanese Patent Application No. 2012-041609, filed Feb. 28, 2012. The entire contents of the above-referenced applications are expressly incorporated herein by reference.

TECHNICAL FIELD

The present invention relates to a regulating device control system, a regulating device control method, and a recording medium, and more particularly relates to a regulating device control system, a regulating device control method, and a recording medium for controlling a plurality of regulating devices for regulating the balance between electric power supply and demand in an electric power system.

BACKGROUND ART

Methods, which have been adopted for regulating the balance between power supply and demand in an electric power system, include a method for controlling the output of thermal power generation and a method of appropriately operating pumping-up hydraulic power generation while controlling the output of thermal power generation.

As renewable power sources such as photovoltaic or wind power generation, in which the amount of generated power depends on weather, are incorporated as distributed power sources in electric power systems in the future, concern arises that these distributed power sources may adversely affect the balance between power supply and demand.

A method of regulating power supply and demand that uses thermal power generation and pumping-up hydraulic power generation may by itself be inadequate to compensate for imbalance in power supply and demand that is brought about by the distributed power sources. As a result, a new method of regulating electric power supply and demand is now essential.

One method, which is thought to be a new method of regulating electric power supply and demand, employs apparatuses such as "storage cells," "electric vehicles (EV)," and heat-pump water heaters (HP) (hereinbelow referred to as "electric power apparatuses") that are linked to the power distribution network of an electric power system as regulating devices for regulating the balance between electric power supply and demand.

Patent Document 1 describes an electric power system control device that regulates the balance between electric power supply and demand by using consumer-side secondary batteries (ES), which are electric power apparatuses, as regulating devices for regulating the balance between electric power supply and demand.

LITERATURE OF THE PRIOR ART

Patent Documents

Patent Document 1: Japanese Unexamined Patent Application Publication No. 2006-094648

SUMMARY OF THE INVENTION

Problem to be Solved by the Invention

The performance of a regulating device changes according to the conditions of use.

For example, deterioration of a regulating device progresses with use, and the performance of the regulating device worsens as the deterioration progresses. The degree of the progression of deterioration of a regulating device varies according to the amount of electric power regulated by the regulating device for regulating the balance between electric power supply and demand and the state of the regulating device (for example, the temperature). The change in the performance of the regulating device further depends on properties other than the deterioration of the regulating device.

A method is therefore to be desired for distributing electric power to a plurality of regulating devices that are used for regulating the balance between electric power supply and demand to reduce the amount of variability in the performance of the plurality of regulating devices.

It is an object of the present invention to provide a regulating device control system, regulating device control method, and recording medium that can solve the above-described problem.

Means for Solving the Problem

The regulating device control system according to the present invention is a regulating device control system that controls the operation of a plurality of regulating devices for regulating the balance between electric power supply and demand in an electric power system, and includes:

memory means that stores, for each of the regulating devices, correlation information that represents the correlation of the state of the regulating device, the amount of electric power allotted to the regulating device, and the amount of variability in the performance of the regulating device;

determination means that receives state information that indicates the state of each regulating device and electric power information that indicates the amount of regulated power necessary for the regulation of the balance between electric power supply and demand and, based on the correlation information, the state information, and the electric power information, determines the amount of electric power to be allotted to each of the regulating devices such that the total value of the amount of variability in the performance of each of the regulating devices is minimized under conditions in which the state of each of the regulating devices is the state indicated in the state information and the total value of the amount of electric power allotted to each of the regulating devices is the amount of regulated power; and control means that controls the operation of each of the regulating devices based on the determination results of the determination means.

The regulating device control method according to the present invention is a regulating device control method in a regulating device control system that controls the operation of a plurality of regulating devices for regulating the balance between electric power supply and demand in an electric power system and includes:

for each of the regulating devices, storing in memory means: correlation information that indicates the correlation of the state of the regulating device, the amount of electric power to be allotted to the regulating device, and the amount of variability in the performance of the regulating device;

receiving state information that indicates the state of each regulating device and electric power information that indicates the amount of regulated power required for the regulation of the balance between the electric power supply and demand, and, based on the correlation information, the state information, and the electric power information, determining the amount of electric power to be allotted to each regulating devices such that the total value of the amount of variability in performance of each of the regulating devices is minimized under conditions in which the state of each of the regulating devices is the state indicated in the state information and the total value of the amount of electric power allotted to each of the regulating devices is the amount of regulated power; and controlling the operation of each of the regulating devices based on the results of the determination.

The recording medium according to the present invention is a recording medium that is readable by a computer and on which a program is recorded for causing a computer to execute:

a storage procedure of storing in memory means, for each of a plurality of regulating devices for regulating the balance between electric power supply and demand in an electric power system, correlation information that indicates the correlation of state information of the regulating device, the amount of electric power to be allotted to the regulating device, and the amount of variability in performance of the regulating device;

a determination procedure of receiving state information that indicates the state of each of the regulating devices and electric power information that indicates the amount of regulated power required for regulating the balance between the electric power supply and demand, and, based on the correlation information, the state information, and the electric power information, determining the amount of electric power to be allotted to each of the regulating devices such that the total value of the amount of variability in performance of each of the regulating devices is minimized under conditions in which the state of each of the regulating devices is the state indicated in the state information and the total value of the amount of electric power allotted to each of the regulating devices is the amount of regulated power; and a control procedure of controlling the operation of each of the regulating devices based on the results of the determination.

Effect of the Invention

According to the present invention, variability in the performance of a plurality of regulating devices that are used for regulating the balance between electric power supply and demand can be reduced.

MODE FOR CARRYING OUT THE INVENTION

Exemplary embodiments of the present invention are next described with reference to the accompanying drawings.

First Exemplary Embodiment

Figure 1:
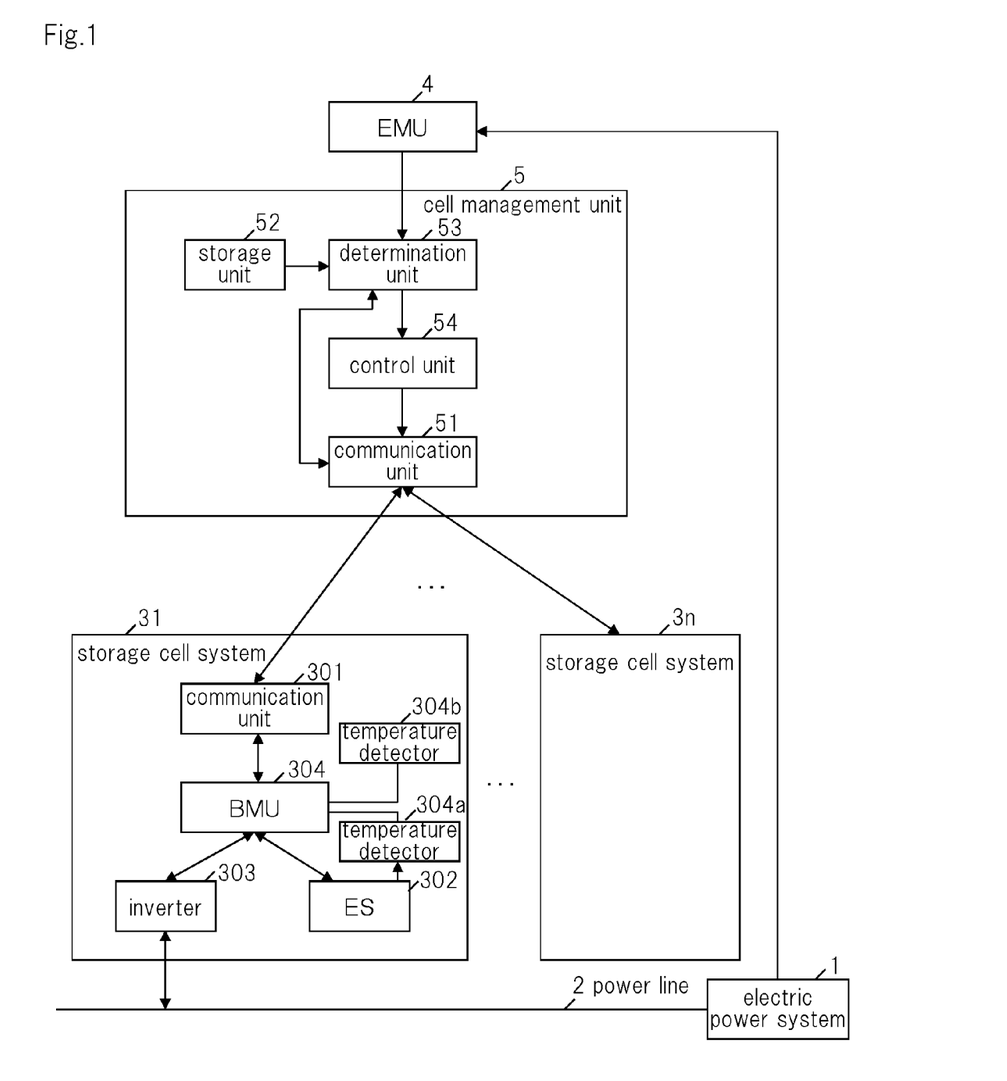
FIG. 1 shows an electric power control system that adopts the regulating device control system of the first exemplary embodiment of the present invention.

FIG. 1 shows an electric power control system that adopts the regulating device control system of the first exemplary embodiment of the present invention.

In FIG. 1, the electric power control system includes: electric power system 1, power line 2, storage cell systems 31-3n (where n is an integer equal to or greater than 2), EMU (Energy Management Unit) 4, and cell management unit 5.

Electric power system 1 is a system for supplying electric power to consumers, and for example, includes a power plant such as a thermal power plant, a renewable power source, and a transformer. Electric power system 1 supplies the generated electric power from the power plant or renewable power source to power line 2 by way of the transformer. Typically, power line 2 is included in electric power system 1, but in FIG. 1, electric power system 1 and power line 2 are shown separately in the interest of simplifying the explanation.

Storage cell systems 31-3n are used for regulating the balance between electric power supply and demand in electric power system 1. For example, storage cell systems 31-3n are each managed by consumers. A number of storage cell systems 31-3n may also be managed on the electric power supply side.

Each of storage cell systems 31-3n includes: communication unit 301, ES (Energy storage) 302, inverter 303, BMU (Battery Management Unit) 304, and temperature detectors 304a and 304b. Regarding communication unit 301, ES 302, inverter 303, BMU 304, and temperature detectors 304a and 304b, FIG. 1 shows the components in storage cell system 31.

Communication unit 301, ES 302, inverter 303, BMU 304, and temperature detectors 304a and 304b in storage cell system 31 are next described.

Communication unit 301 communicates with cell management unit 5.

ES 302 is one example of the regulating device.

ES 302 is, for example, a stationary battery or a secondary battery in an electric vehicle. ES 302 is, for example, a lithium-ion secondary battery. ES 302 is not limited to a lithium-ion secondary battery and may be any type of storage cell.

Inverter 303 converts alternating-current voltage from power line 2 to direct-current voltage during charging of ES 302 and thus charges ES 302 by this direct-current voltage. During discharging of ES 302, inverter 303 converts the direct-current voltage from ES 302 to alternating-current voltage and supplies this alternating-current voltage to power line 2 to thus discharge ES 302.

BMU 304 controls inverter 303 in accordance with operation instructions from cell management unit 5 to control the charging and discharging of ES 302.

In addition, BMU 304 transmits to cell management unit 5 by way of communication unit 301 the detection results of temperature detector 304a that detects the temperature $T_0$ of ES 302 and the detection results of temperature detector 304b that detects the ambient temperature $T_E$ (the temperature of the environment in which ES 302 is placed) of ES 302.

Still further, BMU 304 calculates and manages the amount of reduction of the capacity $D_{total,k}$ from the initialization of ES 302 in storage cell system 31. BMU 304 transmits the amount of reduction of capacity $D_{total,k}$ to cell management unit 5 by way of communication unit 301. The method of calculating the amount of reduction of capacity $D_{total,k}$ from the initialization of ES 302 is known technology, and a detailed explanation is therefore here omitted.

The temperature $T_0$ of ES 302, the ambient temperature $T_E$ of ES 302, and the amount of reduction of capacity $D_{total,k}$ of ES 302 are examples of the state of ES 302.

An explanation regarding communication unit 301, ES 302, inverter 303, BMU 304, and temperature detectors 304a and 304b in each storage cell system other than storage cell system 31 (hereinbelow referred to as "storage cell system 3a") may be derived by merely changing the words "storage cell system 31" to "storage cell system 3a" in the explanation regarding communication unit 301, ES 302, inverter 303, BMU 304, and temperature detectors 304a and 304b in storage cell system 31 described above.

EMU 4 calculates the amount of regulated power $P_t$ that is required for regulation of the balance between electric power supply and demand. For example, when there is a portion that exceeds the reference threshold value that is the standard for judging the presence or absence of a peak-cutting process (hereinbelow referred to as the "peak-cutting object portion") on the future estimated total demand curve that has been provided or calculated in advance, EMU 4 calculates the amount of electric power that corresponds to this peak-cutting object portion as the amount of regulated power $P_t$.

In the present exemplary embodiment, EMU 4 takes the value of the amount of regulated power $P_t$ as a positive value when demand for electric power is necessary for regulating the balance between electric power supply and demand and takes the value of the amount of regulated power $P_t$ as a negative value when supply of electric power is necessary for regulating the balance between electric power supply and demand.

EMU 4 transmits power information that indicates the amount of regulated power $P_t$ to cell management unit 5.

In the present exemplary embodiment, EMU 4 calculates the amount of regulated power $P_t$ for the passage of each time interval $\Delta t$ and transmits the power information that indicates the amount of regulated power $P_t$ to cell management unit 5.

Cell management unit 5 is one example of the regulating device control system.

Cell management unit 5 controls the operation of storage cell systems 31-3n, and further, the operation of each ES 302 to regulate the balance between electric power supply and demand in electric power system 1.

Cell management unit 5 includes: communication unit 51, storage unit 52, determination unit 53, and control unit 54.

Communication unit 51 communicates with each of storage cell systems 31-3n.

Communication unit 51 receives, for example, the detection results of the temperature $T_0$ of ES 302, the detection results of the ambient temperature $T_E$ of ES 302, and the result of calculation of the amount of reduction of capacity $D_{total,k}$ of ES 302 from each of storage cell systems 31-3n and supplies each of the detection results and calculation results to determination unit 53.

Storage unit 52 is one example of the memory means.

Storage unit 52 stores for each of ES 302 within storage cell systems 31-3n correlation information that indicates the correlation of the state of ES 302, the amount of electric power allotted to ES 302, and the amount of variability in deterioration of ES 302. The amount of change in deterioration of ES 302 is one example of the amount of variability in the performance of ES 302.

For example, storage unit 52 stores the following Formula (1) as the correlation information for each ES 302 within storage cell systems 31-3n.

Formula 1

$$\text{amount of change in deterioration} = D_k(P_k, x_k) \quad (1)$$

Here, k=1–n

The amount of change in deterioration indicates the amount of change in deterioration of ES 302 within storage cell system k.

$P_k$ indicates the amount of electric power (W) managed by ES 302 within storage cell system k, i.e., the amount of electric power (W) that is assigned to ES 302 within storage cell system k.

$x_k$ represents the state of ES 302 within storage cell system k (in the present exemplary embodiment, temperature $T_0$ of ES 302 in storage cell system k, ambient temperature $T_E$ of ES 302 in storage cell system k, and the amount of reduction of capacity $D_{total,k}$ of ES 302 in storage cell system k).

$D_k(P_k, x_k)$ represents the amount of the reduction of capacity when ES 302 in storage cell system k is used for a time interval $\Delta t$ under conditions in which ES 302 in storage cell system k is in state $x_k$ and ES 302 in storage cell system k is allotted an amount of electric power $P_k$, i.e., $D_k(P_k, x_k)$ represents the amount of change in the deterioration of ES 302 in storage cell system k.

In addition, storage unit 52 stores the minimum value $P_{min,k}$ and maximum value $P_{max,k}$ of the amount of charging/discharging of ES 302 for each ES 302 within storage cell systems 31-3n.

When temperature is the overriding factor among causes of the reduction of capacity of ES 302 within storage cell system k, $D_k$ follows the Arrhenius law and the square root law, whereby $D_k$ can be approximately represented as in the following Formula (2):

$$D_k(P_k, T_0, T_E, D_{total,k}) = \frac{a_{1,k}}{D_{total,k}} \int_0^{\Delta t} \exp\left(\frac{a_{2,k}}{T_k(P_k, T_0, T_E, t)}\right) dt \quad \text{Formula (2)}$$

where $a_{1,k}$ and $a_{2,k}$ are constants relating to deterioration inherent to ES 302 within storage cell system k.

The function $T_k(P_k, T_0, T_E, t)$ in Formula (2) is a formula that represents the change in temperature of ES 302 in storage cell system k and is a function that gives the temperature at time t where time 0 is the current time, temperature $T_0$ is the current temperature of ES 302, and temperature $T_E$ is the current ambient temperature of ES 302. For example, the function $T_k(P_k, T_0, T_E, t)$ can be represented as in the following Formula (3):

Formula (3)

$$T_k(P_k, T_0, T_E, t) = (T_0 - T_E + a_{3,k}P)\exp(ta_{4,k}) - a_{3,k}P + T_E \quad (3)$$

where $a_{3,k}$ and $a_{4,k}$ are constants relating to the deterioration inherent to ES 302 in storage cell system k.

In Formula (2), the values corresponding to $x_k$ of Formula (1) are $T_0$, $T_E$, and $D_{total,k}$, and $a_{1,k}$, $a_{2,k}$, and $a_{4,k}$ in Formula (2) and Formula (3) are constants.

Figure 2:
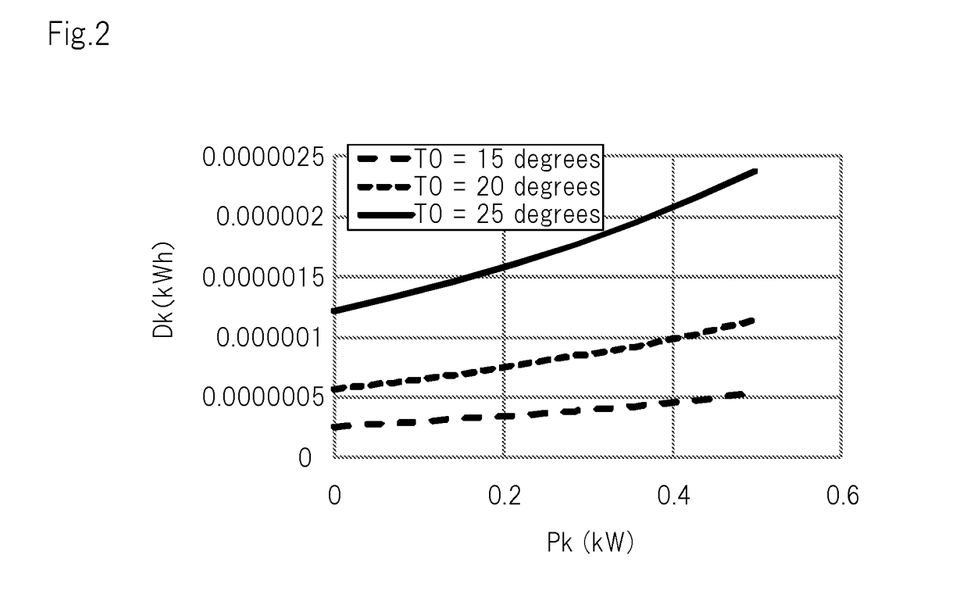
FIG. 2 shows an example of the value of $D_k$ when temperature $T_0$ is 15, 20, and 25 degrees.

FIG. 2 shows an example of the values of $D_k$ when temperature $T_0$ is 15, 20, and 25 degrees.

In addition, $D_k$ is not limited to values specified in Formula (2) and Formula (3) and can be modified as appropriate.

In the present exemplary embodiment, storage unit 52 stores Formula (2) and Formula (3) as correlation information for each ES 302 in storage cell systems 31-3n.

Determination unit 53 is one example of the determination means.

Determination unit 53 receives the detection results of temperature $T_0$ of each ES 302, the detection results of ambient temperature $T_E$ of each ES 302, the calculation results of the amount of reduction of capacity $D_{total,k}$ of each ES 302, and electric power information that indicates the amount of regulated power $P_r$. The detection results of temperature $T_0$ of each ES 302, the detection results of ambient temperature $T_E$ of each ES 302, and the calculation results of the amount of reduction of capacity $D_{total,k}$ of each ES 302 are examples of state information.

Determination unit 53 determines the amount of electric power $P_t$ to be allotted to each ES 302 based on the detection results of temperature $T_0$ of each ES 302, the detection results of ambient temperature $T_E$ of each ES 302, the calculation results of the amount of reduction of capacity $D_{total,k}$ of each ES 302, the correlation information in storage unit 52, and electric power information that indicates the amount of regulated electric power $P_t$ so as to minimize the amount of increase of the deterioration of each ES 302 that is caused by the use of each ES 302 in the regulation of the balance between electric power supply and demand.

In the present exemplary embodiment, determination unit 53 determines the amount of electric power $P_k$ that is to be allotted to each ES 302 based on the detection results of temperature $T_0$ of each ES 302, the detection results of ambient temperature $T_E$ of each ES 302, the calculation results of the amount of reduction of capacity $D_{total,k}$ of each ES 302, the correlation information in storage unit 52, and the electric power information that indicates the amount of regulated power $P_t$ such that the total value of the amount of change in deterioration $D_k$ of each ES 302 is minimized under conditions in which the state of each ES 302 is the state notified from each storage cell system (the detection results of temperature $T_0$ of each ES 302, the detection results of ambient temperature $T_E$ of each ES 302, and the calculation results of the amount of reduction of capacity $D_{total,k}$ of each ES 302) and the total value of the amount of electric power allotted to each ES 302 is the amount of regulated power $P_t$.

When the state of each ES 302 has not been reported from each storage cell system, determination unit 53 estimates the state of each ES 302 by means of the correlation information that is maintained in storage unit 52. Determination unit 53 then determines the amount of electric power $P_k$ to be allotted to each ES 302 based on the estimated state of each ES 302, the correlation information in storage unit 52, and the electric power information that indicates the amount of regulated power $P_t$, similar to a case in which the states have been reported. For example, determination unit 53 is able to estimate the current temperature of each ES 302 by substituting into Formula (3) detection results of the temperatures of each ES 302 that were received in the past, detection results of ambient temperatures of each ES 302 that were received in the past, calculation results of the amount of reduction of capacity that were received in the past, and the amount of regulated power that was transmitted by way of control unit 54 in the past, is able to estimate the amount of change up to the present time of the amount of reduction of capacity by substituting these values into Formula (2), and is able to estimate the current amount of deterioration of capacity of each ES 302 by adding this value to the amounts of reduction of capacity of each ES 302 that were received in the past.

Even in a case in which the state of each ES 302 has been reported from each storage cell system, an improvement of the accuracy of the correlation information may be achieved if determination unit 53 estimates the state of each ES 302 and then compares these estimated results with the reported states to amend the correlation information that is kept in storage unit 52.

Examples of the state of each ES 302 notified to determination unit 53 from each storage cell system include, in addition to the detection results of temperature $T_0$ of each ES 302, the detection results of the ambient temperature $T_E$ of each ES 302, and the calculation results of the amount of reduction of capacity $D_{total,k}$ of each ES 302: the internal impedance value of each ES 302, the thickness of each ES 302, the volume of each ES 302, the internal pressure of each ES 302, the number of charge/discharge cycles up to the current time of each ES 302, the cross-terminal voltage of each ES 302, and the SoC value of each ES 302 that is shown in the second exemplary embodiment to be described later.

Control unit 54 is one example of control means.

Control unit 54 controls the operation of each ES 302 based on the determination results of determination unit 53. In the present exemplary embodiment, control unit 54 transmits to each of storage cell systems 31-3n operation instructions indicating electric power $P_k$ that is to be allotted to each ES 302 that was determined by determination unit 53.

The operation is next described.

Figure 3:
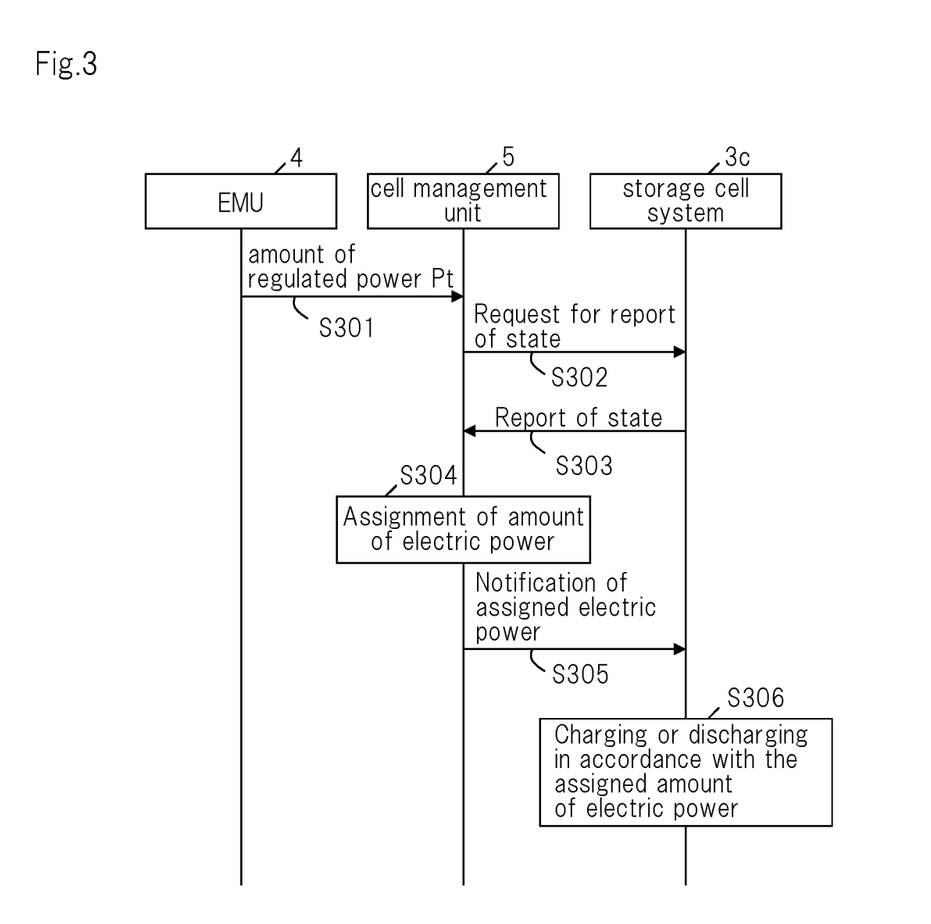
FIG. 3 is a sequence diagram for describing the operation of the electric power control system.

FIG. 3 is a sequence diagram for describing the operation of an electric power control system. In FIG. 3, only storage cell system 3c among storage cell systems 31-3n is shown in the interest of simplifying the explanation.

When EMU 4 calculates the amount of regulated power $P_t$ and transmits electric power information indicating the amount of regulated power $P_t$ to cell management unit 5 (Step S301), determination unit 53 in cell management unit 5 receives the electric power information.

Upon receiving the electric power information, determination unit 53 transmits a request to report state (hereinbelow referred to as a "state report request") to each of storage cell systems 31-3n by way of communication unit 51 (Step S302).

In each of storage cell systems 31-3n, upon receiving the state report request by way of communication unit 301, BMU 304 transmits the detection results of temperature detector 304a (the temperature $T_0$ of ES 302), the detection results of temperature detector 304b (the ambient temperature $T_E$ of ES 302), and the calculation results of the amount of reduction of capacity $D_{total,k}$ of ES 302 as state reports to cell management unit 5 by way of communication unit 301 (Step S303).

In cell management unit 5, upon receiving the state reports from each of storage cell systems 31-3*n*, determination unit 53 executes an operation to determine the amount of electric power $P_k$ to be allotted to each ES 302 (Step S304).

In the present exemplary embodiment, determination unit 53 in Step S304 determines the amount of electric power $P_k$ to be allotted to each ES 302 that simultaneously satisfies the following Formula (4), Formula (5), and Formula (6).

Formula (4)

$$P_t - \Sigma_{k=1}^N P_k = 0 \qquad (4)$$

Formula (5)

$$P_{min\ k} \leq P_k \leq P_{max\ k} \qquad (5)$$

Formula (6)

$$\Sigma_{k=1}^N D_k(P_k, x_k) \to \min \qquad (6)$$

For example, determination unit 53 finds a plurality of sets of electric power amounts $P_1$-$P_n$ of each ES 302 in storage cell systems 31-3*n* that satisfy Formula (4) and Formula (5), finds the total value of $D_k$ for each set, and then determines the sets of the amounts of electric power $P_1$-$P_n$ for which the total values of $D_k$ are a minimum as the electric power amounts $P_1$-$P_n$ that are to be allotted to each ES 302 in storage cell systems 31-3*n*.

For example, in some cases determination unit 53 gives values of $P_1$-$P_n$ such that $dD_k/dP_k$, which are the values obtained by differentiating $D_k$ by each $P_k$, are identical, with the exception of cases in which the values of $P_1$-$P_n$ are amounts of electric power where $P_k = P_{min,k}$ or $P_k = P_{min,k}$.

Determination unit 53, upon determining the amounts of electric power $P_1$-$P_n$ that are allotted to each ES 302 in storage cell systems 31-3*n*, supplies these determination results to control unit 54.

Control unit 54, upon receiving the determination results of determination unit 53, transmits by way of communication unit 51 operation instructions indicating the amounts of electric power that were determined for ES 302 within the storage cell system for each of storage cell systems 31-3*n* (Step S305).

In each of storage cell systems 31-3*n*, BMU 304, upon receiving the operation instructions by way of communication unit 301, uses inverter 303 to charge ES 302 by the amount of electric power indicated in the operation instruction when the amount of electric power indicated in the operation instruction is a positive value (Step S306).

On the other hand, when the amount of electric power indicated in the operation instruction is a negative value, BMU 304 uses inverter 303 to discharge the amount of electric power indicated in the operation instruction from ES 302 (Step S306).

The effect of the present exemplary embodiment is next described.

According to the present exemplary embodiment, storage unit 52 stores for each ES 302 correlation information that indicates the correlation of the state of ES 302, the amount of electric power allotted to ES 302, and the amount of change in the performance of ES 302 (the amount of change in deterioration).

Determination unit 53 receives state information that indicates the state of each ES 302 and electric power information that indicates the amount of regulated power required for the regulation of the balance between electric power supply and demand. Determination unit 53, based on the correlation information, the state information, and the electric power information, determines the amount of electric power that is to be allotted to each ES 302 such that the total value of the amount of change of performance (amount of change in deterioration) of each ES 302 is minimized under conditions in which the state of each ES 302 is the state indicated by the state information and the total value of the amount of electric power allotted to each ES 302 is the amount of regulated power.

Control unit 54 controls the operation of each ES 302 based on the determination results of determination unit 53.

As a result, electric power can be assigned to a plurality of ES 302 such that variability in the performance of the plurality of ES 302 that are used for regulating the balance between electric power supply and demand is reduced.

Figure 4:
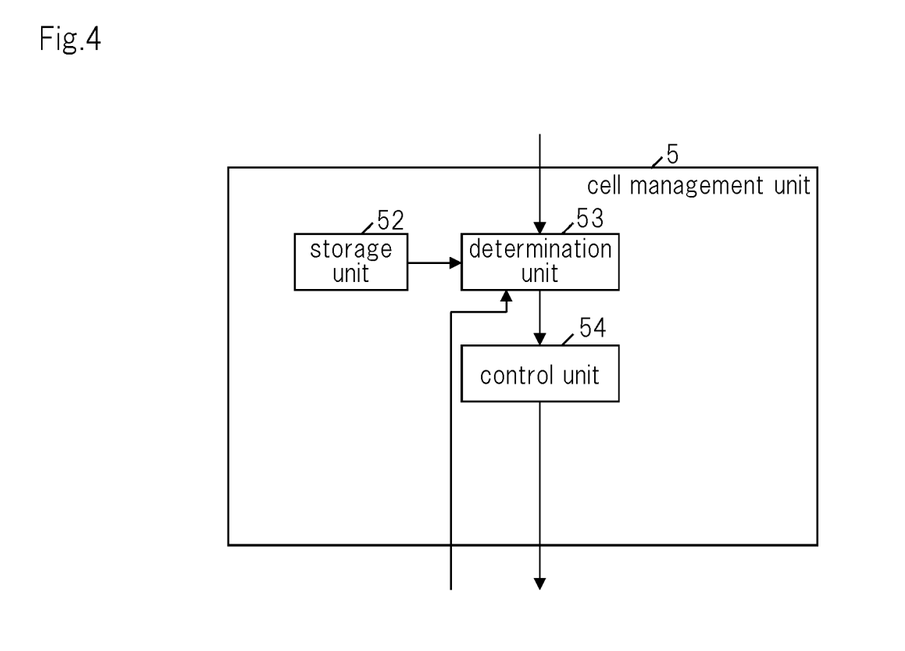
FIG. 4 shows cell management unit 5 that is made up of storage unit 52, determination unit 53, and control unit 54.

The above-described effect is exhibited even by cell management unit 5 that is made up by storage unit 52, determination unit 53, and control unit 54.

FIG. 4 shows cell management unit 5 that is made up of storage unit 52, determination unit 53, and control unit 54.

In the present exemplary embodiment, the amount of deterioration of ES 302 was used as the amount of variability in the performance of ES 302.

As a result, electric power can be assigned to a plurality of ES 302 such that the deterioration of the plurality of ES 302 that are used for regulating the balance between electric power supply and demand is reduced.

In the present exemplary embodiment, moreover, ES 302 (storage batteries) are used as the regulating devices for regulating the balance between electric power supply and demand in an electric power system, and the temperature of ES 302, the ambient temperature of ES 302, and the amount of reduction of capacity from the initialization of ES 302 are used as the states of the regulating devices.

Thus, when temperature in particular is taken as the overriding factor among the causes of the reduction (deterioration) of capacity of ES 302, electric power can be assigned to a plurality of ES 302 such that the deterioration of the plurality of ES 302 is reduced.

In FIG. 1, determination unit 53 and control unit 54 were shown as separate apparatuses, but determination unit 53 may incorporate control unit 54.

In FIG. 1, moreover, a regulating device control system that includes communication unit 51, storage unit 52, determination unit 53, and control unit 54 is incorporated in cell management unit 5, but all of communication unit 51, storage unit 52, determination unit 53, and control unit 54 need not be incorporated in the same apparatus.

In the present exemplary embodiment, determination unit 53 acquires the state of each ES 302 after receiving electric power information that indicates the amount of regulated power, but determination unit 53 may also acquire the states of each ES 302 before receiving the electric power information.

Alternatively, determination unit 53 may repeat the operations of Steps S302, S304, and S305 shown in FIG. 3 within time intervals between receiving electric power information.

Cell management unit 5 may also be realized by a computer. In this case, the computer reads and executes a program that is recorded on a recording medium such as a CD-ROM (Compact Disk Read Only Memory) that can be read in a computer and then functions as communication unit 51, storage unit 52, determination unit 53, and control unit 54. The recording medium is not limited to a CD-ROM and can be modified as appropriate.

Second Exemplary Embodiment

The second exemplary embodiment of the present invention is next described.

Figure 5:
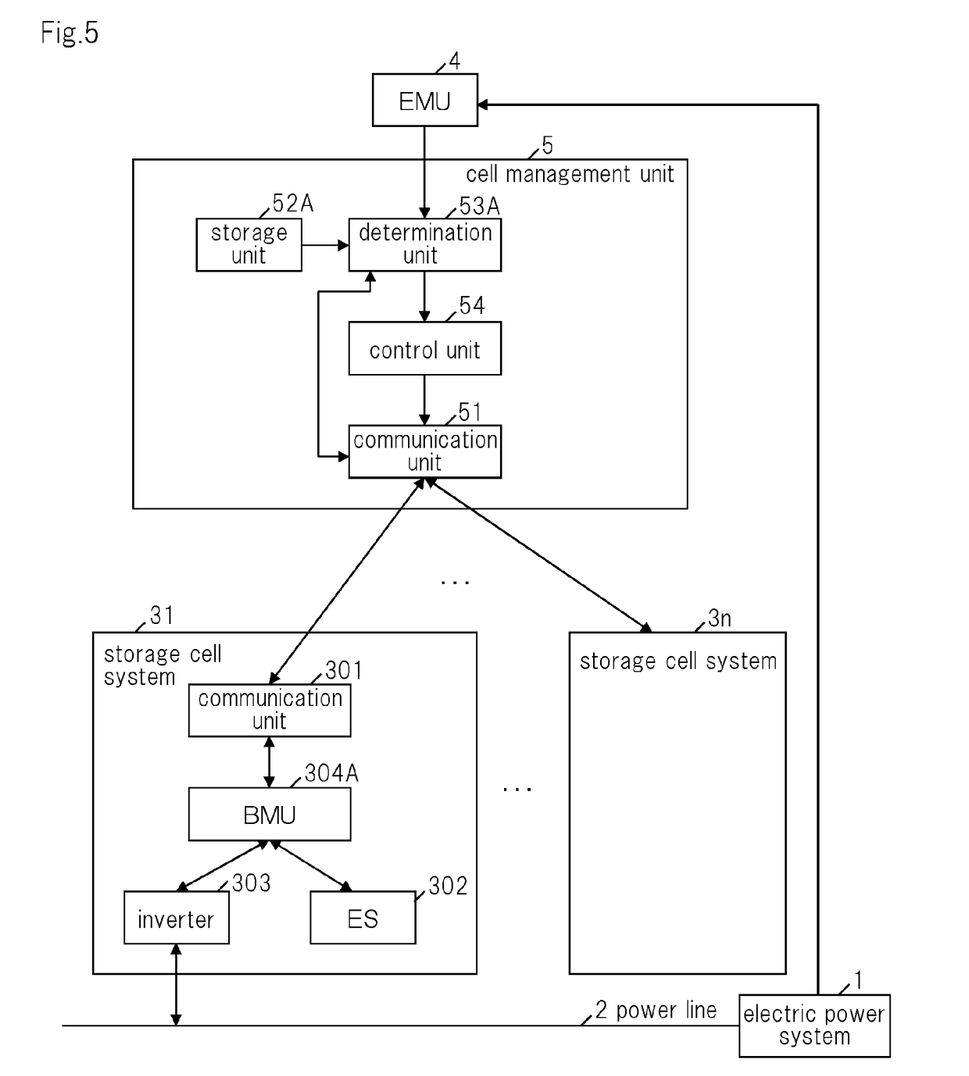
FIG. 5 shows an electric power control system that adopts the regulating device control system of the second exemplary embodiment of the present invention.

FIG. 5 shows an electric power control system that adopts the regulating device control system of the second exemplary embodiment of the present invention. In FIG. 5, constructions that are identical to those shown in FIG. 1 are given the same reference numbers. The following explanation focuses on points of the electric power control system shown in FIG. 5 that differ from the electric power control system shown in FIG. 1.

Although the regulating device control system of the first exemplary embodiment used correlation information suited to a case in which temperature was the overriding factor among causes of the reduction (deterioration) of capacity of ES 302, the regulating device control system of the second exemplary embodiment uses correlation information suited for a case in which the SoC (State of Charge) of ES 302 is the overriding factor as a cause of the reduction (deterioration) of the capacity of ES 302.

In FIG. 5, each of storage cell systems 31-3n includes BMU 304A in place of BMU 304 and leaves out temperature detectors 304a and 304b; and cell management unit 5 includes storage unit 52A in place of storage unit 52 and includes determination unit 53A in place of determination unit 53.

BMU 304A, similar to BMU 304, controls inverter 303 in accordance with operation instructions from cell management unit 5 to control the charging and discharging of ES 302.

In addition, BMU 304A calculates and manages $SoC_0$, which is the current SoC value of ES 302, the current capacity $C_k$ of ES 302, and the amount of reduction of capacity $D_{total,k}$ from the initialization of ES 302. BMU 304A transmits $SoC_0$ of ES 302, the current capacity $C_k$ of ES 302, and the amount of reduction of capacity $D_{total,k}$ from initialization of ES 302 to cell management unit 5 by way of communication unit 301.

The techniques of computing $SoC_0$ of ES 302, the current capacity $C_k$ of ES 302, and the amount of reduction of capacity $D_{total,k}$ from the initialization of ES 302 are known technology and detailed explanation is therefore here omitted.

$SoC_0$ of ES 302, the current capacity $C_k$ of ES 302, and the amount of reduction of capacity $D_{total,k}$ from the initialization of ES 302 are examples of the state of ES 302.

Storage unit 52A is one example of the memory means.

Storage unit 52A stores the following Formula (7) and Formula (8) as the above-described Formula (1).

Formula (7)

$$D_k(P_k, SoC_0, C_k, D_{total,k}) = \frac{b_{1,k}}{D_{total,k}} \int_0^{\Delta t} \exp\left(b_{2,k} V\left(SoC_0 + \frac{P_k \cdot t}{C_k}\right)\right) dt \quad \text{Formula (7)}$$

Here, $b_{1,k}$ and $b_{2,k}$ are constants relating to deterioration inherent to ES 302 in storage cell system k.

Formula 8

$$V(SoC) = b_{3,k} SoC^3 + b_{4,k} SoC^2 + b_{5,k} SoC + b_{6,k}$$

Here, $b_{3,k}$, $b_{4,k}$, $b_{5,k}$, and $b_{6,k}$ are constants relating to deterioration inherent to ES 302 in storage cell system k.

Function V(SoC) in Formula (7) is a formula that expresses the cross-terminal voltage of ES 302 in storage cell system k and that takes the value SoC as an argument. In addition, because we wish to know the cross-terminal voltage at time t in Formula (7), SoC value at time t=($SoC_0$+$P_k t/C_k$) is taken as an argument. Formula (8) is a value obtained by, for example, approximating the function V(SoC) in Formula (7) by a polynomial.

In Formula (7), the values that correspond to $x_k$ of Formula (1) are $SoC_0$, $C_k$, and $D_{total,k}$: and $b_{1,k}$, $b_{2,k}$, $b_{3,k}$, and $b_{4,k}$, which are values representing the deterioration inherent to ES 302, are constants.

Figure 6:
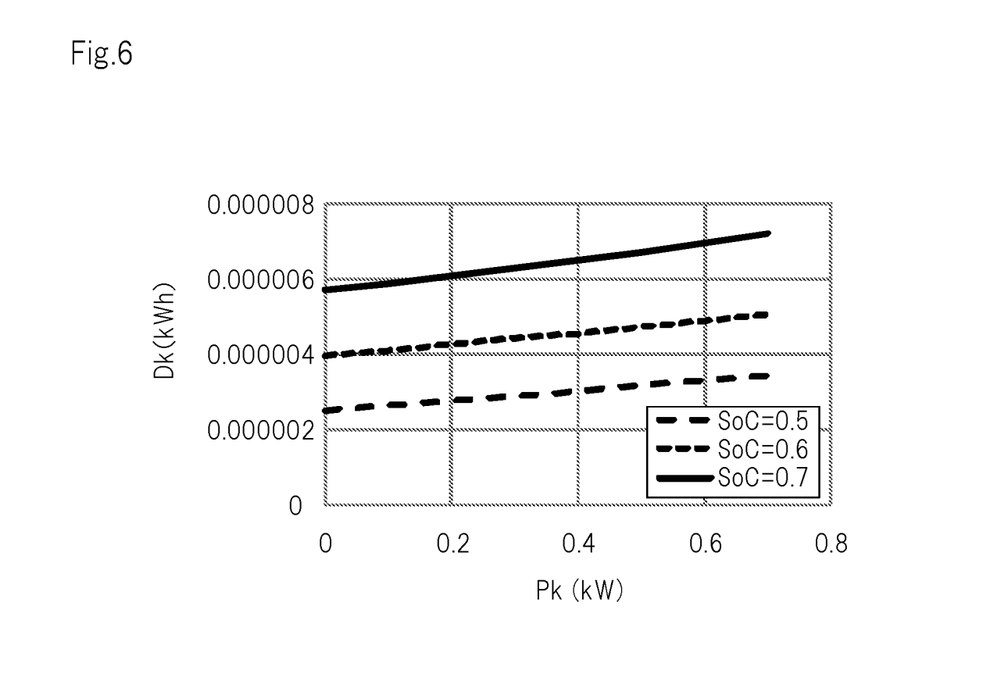
FIG. 6 shows an example of the value of $D_k$ when temperature $SoC_0$ is 0.5, 0.6, and 0.7.

FIG. 6 shows an example of the values of $D_k$ when $SoC_0$ is 0.5, 0.6, and 0.7.

In addition, storage unit 52A stores for each ES 302 in storage cell systems 31-3n the minimum value $P_{min,k}$ and maximum value $P_{max,k}$ of the amount of charging/discharging of ES 302.

Determination unit 53A is one example of the determination means.

Determination unit 53A receives $SoC_0$ of each ES 302, the current capacity $C_k$ of each ES 302, the amount of reduction of capacity $D_{total,k}$ from initialization of each ES 302, and electric power information that indicates the amount of regulated power $P_t$. The $SoC_0$ of each ES 302, the current capacity $C_k$ of each ES 302, and the amount of reduction of capacity $D_{total,k}$ from initialization of each ES 302 are examples of state information.

Based on Formula (7) and Formula (8) in storage unit 52A, $SoC_0$ of each ES 302, the current capacity $C_k$ of each ES 302, the amount of reduction of capacity $D_{total,k}$ from initialization of each ES 302, and electric power information that indicates the amount of regulated power $P_t$, determination unit 53A determines the amount of electric power $P_k$ to be allotted to each ES 302 that simultaneously satisfies the above-described Formula (4), Formula (5), and Formula (6).

Upon determining the amounts of electric power $P_1$-$P_n$ to be allotted to each ES 302 in storage cell systems 31-3n, determination unit 53A supplies the determination results to control unit 54.

Control unit 54, upon receiving the determination results of determination unit 53, transmits operation instructions indicating the amount of electric power that was determined to ES 302 in the storage cell system by way of communication unit 51.

According to the present exemplary embodiment, ES 302 (storage cells) are used as regulating devices for regulating the balance between electric power supply and demand of an electric power system, and the SoC of ES 302, the current capacity of ES 302, and the amount of reduction of capacity from initialization of ES 302 are used as the states of the regulating devices.

As a result, when the SoC value has a particularly large effect in causing the reduction (deterioration) of capacity of ES 302, electric power can be assigned to a plurality of ES 302 such that the deterioration of the plurality of ES 302 is reduced.

In FIG. 5, determination unit 53A and control unit 54 are shown as separate components, but determination unit 53A may incorporate control unit 54.

In addition, although a regulating device control system that includes communication unit 51, storage unit 52A, determination unit 53A, and control unit 54 is incorporated in cell management unit 5 in FIG. 5, all of communication unit 51, storage unit 52A, determination unit 53A, and control unit 54 need not be incorporated in the same apparatus.

Cell management unit 5 shown in FIG. 5 may be realized by a computer. In this case, the computer reads and executes a program that is recorded on a recording medium that can be read in the computer to function as communication unit 51, storage unit 52A, determination unit 53A, and control unit 54.

In each of the above-described exemplary embodiments, each ES 302 may be storage cells having mutually differing properties, or may be storage cells having identical properties.

In each of the above-described exemplary embodiments, EMU 4 may take the value of the amount of regulated power $P_t$ as a negative value when demand for electric power is necessary for regulating the balance between electric power supply and demand, and may take the value of amount of regulated power $P_t$ as a positive value when supply of electric power is necessary for regulating the balance between electric power supply and demand. In this case, when the amount of electric power indicated by an operation instruction is a negative value, BMU 304 uses inverter 303 to charge ES 302 with the amount of electric power indicated by the operation instruction. On the other hand, when the amount of electric power indicated by the operation instruction is a positive value, BMU 304 uses inverter 303 to discharge the amount of electric power indicated by the operation instruction from ES 302.

In each of the above-described exemplary embodiments, the amount of change in the performance of ES 302 is not limited to the amount of change in deterioration of ES 302 and can be modified as appropriate.

In each of the above-described exemplary embodiments, the configurations shown in the drawings are merely examples and the present invention is not limited to these configurations.

Although the invention of the present application has been described with reference to each of the exemplary embodiments, the invention of the present application is not limited to the above-described exemplary embodiments. The configuration and details of the invention of the present application are open to various modifications within the scope of the invention of the present application that will be clear to one of ordinary skill in the art. This application claims the benefits of priority based on Japanese Patent Application No. 2012-041609 for which application was submitted on Feb. 28, 2012 and incorporates by citation all of the disclosures of that application.

EXPLANATION OF THE REFERENCE NUMBERS 1 electric power system
2 power line
31-3n storage cell system
301 communication unit
302 ES
303 inverter
304, 304A BMU
304a, 304b temperature detector
4 EMU
5 cell management unit
51 communication unit
52, 52A storage unit
53, 53A determination unit
54 control unit

What is claimed is:

1. A regulating device control system that controls the operation of a plurality of regulating devices for regulating a balance between electric power supply and demand in an electric power system, comprising:
    a memory that stores, for each of said regulating devices, correlation information that represents correlation of a state of the regulating device, an amount of electric power to be allotted to the regulating device, and an amount of variability in performance of the regulating device;
    a computer processor that
        estimates state information of each regulating device based on historical state information of each regulating device,
        receives electric power information that indicates an amount of regulated power that is necessary for the regulation of said balance between electric power supply and demand and, based on said correlation information, said estimated state information, and said electric power information,
        determines the amount of electric power to be allotted to each of said regulating devices such that a total value of the amount of variability in the performance of each of said regulating devices is minimized based on said estimated state information, wherein a total value of the amount of electric power allotted to each of said regulating devices is said amount of regulated power, and
        controls the operation of each of said regulating devices based on the respective determined amount of electric power to be allotted, wherein the state of each regulating device stored in the memory is amended based on a comparison of a state reported by each regulating device and the respective estimated state.

2. The regulating device control system as set forth in claim 1, wherein the amount of variability in performance of said regulating devices is an amount of variability in deterioration of said regulating devices.

3. The regulating device control system as set forth in claim 2, wherein:
    said regulating devices are storage cells; and
    the states of said regulating devices include a temperature of said storage cells, an ambient temperature of said storage cells, and an amount of reduction of capacity from the initialization of said storage cells.

4. The regulating device control system as set forth in claim 2, wherein:
    said regulating devices are storage cells; and
    the states of said regulating devices include State of Charge (SoC) of said storage cells, a capacity of said storage cells, and an amount of reduction of capacity after initialization of said storage cells.

5. A regulating device control method in a regulating device control system that controls the operation of a plurality of regulating devices for regulating a balance between electric power supply and demand in an electric power system, comprising:
    for each of said regulating devices, storing in memory means: correlation information that indicates correlation of a state of the regulating device, an amount of electric power to be allotted to the regulating device, and an amount of variability in performance of the regulating device;
    estimating state information of each regulating device based on historical state information of each regulating device;
    receiving electric power information that indicates an amount of regulated power that is required for the regulation of said balance between the electric power supply and demand, and, based on said correlation information, said estimated state information, and said electric power information;

determining the amount of electric power to be allotted to each of said regulating devices such that a total value of the amount of variability in performance of each of said regulating devices is minimized based on said estimated state information, wherein a total value of the amount of electric power allotted to each of said regulating devices is said amount of regulated power; and controlling the operation of each of said regulating devices based on the respective determined amount of electric power to be allotted, wherein the state of each regulating device stored in the memory means is amended based on a comparison of a state reported by each regulating device and the respective estimated state.

6. The regulating device control method as set forth in claim 5, wherein the amount of variability in performance of said regulating devices is an amount of variability in deterioration of said regulating devices.

7. The regulating device control method as set forth in claim 6, wherein:

said regulating devices are storage cells; and the states of said regulating devices include a temperature of said storage cells, an ambient temperature of said storage cells, and an amount of reduction of capacity from the initialization of said storage cells.

8. The regulating device control method as set forth in claim 6, wherein:

said regulating devices are storage cells; and the states of said regulating devices include State of Charge (SoC) of said storage cells, a capacity of said storage cells, and an amount of reduction of capacity after initialization of said storage cells.

9. A non-transitory computer-readable storage medium on which a program is stored, the program, when executed by a computer, causing the computer to perform a method comprising:

storing in a memory, for each of a plurality of regulating devices for regulating a balance between electric power supply and demand in an electric power system, correlation information that indicates correlation of a state of the regulating device, an amount of electric power to be allotted to the regulating device, and an amount of variability in performance of the regulating device;

estimating state information of each regulating device based on historical state information of each regulating device;

receiving electric power information that indicates an amount of regulated power that is required for regulating said balance between said electric power supply and demand, and, based on said correlation information, said estimated state information, and said electric power information;

determining the amount of electric power to be allotted to each of said regulating devices such that a total value of the amount of variability in performance of each of said regulating devices is minimized based on said estimated state information, wherein a total value of the amount of electric power allotted to each of said regulating devices is said amount of regulated power; and controlling the operation of each of said regulating devices based on the respective determined amount of electric power to be allotted, wherein the state of each regulating device stored in the memory is amended based on a comparison of a state reported by each regulating device and the respective estimated state.

10. The non-transitory computer-readable storage medium as set forth in claim 9, wherein the amount of variability in performance of said regulating devices is an amount of variability in deterioration of said regulating devices.

11. The non-transitory computer-readable storage medium as set forth in claim 10, wherein:

said regulating devices are storage cells; and the states of said regulating devices include a temperature of said storage cells, an ambient temperature of said storage cells, and an amount of reduction of capacity from the initialization of said storage cells.

12. The non-transitory computer-readable storage medium as set forth in claim 10, wherein:

said regulating devices are storage cells; and the states of said regulating devices include State of Charge (SoC) of said storage cells, a capacity of said storage cells, and an amount of reduction of capacity after initialization of said storage cells.

* * * * *